US007756473B2

(12) United States Patent
Seo et al.

(10) Patent No.: US 7,756,473 B2
(45) Date of Patent: Jul. 13, 2010

(54) APPARATUS AND METHOD OF ON-CHANNEL REPEATER

(75) Inventors: Jae-Hyun Seo, Daejon (KR); Yong-Tae Lee, Daejon (KR); Heung-Mook Kim, Daejon (KR); Ho-Min Eum, Daejon (KR); Sung-Ik Park, Daejon (KR); Seung-Won Kim, Daejon (KR); Soo-In Lee, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 869 days.

(21) Appl. No.: 11/579,789

(22) PCT Filed: Dec. 31, 2004

(86) PCT No.: PCT/KR2004/003560

§ 371 (c)(1),
(2), (4) Date: Nov. 7, 2006

(87) PCT Pub. No.: WO2005/109876

PCT Pub. Date: Nov. 17, 2005

(65) Prior Publication Data

US 2007/0224934 A1 Sep. 27, 2007

(30) Foreign Application Priority Data

May 12, 2004 (KR) .................... 10-2004-0033654

(51) Int. Cl.
H04B 7/14 (2006.01)

(52) U.S. Cl. .............................. 455/22; 455/18; 455/16; 455/23

(58) Field of Classification Search ................ None
See application file for complete search history.

(56) References Cited

U.S. PATENT DOCUMENTS 6,385,435 B1 * 5/2002 Lee ............................. 455/24

(Continued)

FOREIGN PATENT DOCUMENTS

CN 2543301 Y 4/2003

(Continued)

OTHER PUBLICATIONS

Wang, Jintao, et al., "A New Implementation of Single Frequency Network Based on DMB-T", Jun. 2004, *Communications, Circuits and Systems* vol. 1, pp. 246-259.

(Continued)

*Primary Examiner*—Philip J Sobutka
(74) *Attorney, Agent, or Firm*—Ladas & Parry LLP

(57) ABSTRACT

Provided are an on-channel repeater and a method thereof. The repeater receives signals on one channel and distributes the signals on the same channel by converting RF signals from a main transmitter into baseband signals; equalizing them in a high-performance equalizer, adding a repeater identifier to them; modulating the baseband signals with the repeater identifier into RF signals. The repeater includes: a receiver for receiving RF signals; a demodulator for demodulating the RF signals into baseband signals; an equalizer for equalizing the baseband signals; an adder for adding a repeater identifier to the baseband signals; a modulator for modulating the baseband signals with the repeater identifier added in the adder into RF signals; and a transmitter for transmitting the RF signals modulated in the modulator. The technology of the present invention is used to form an on-channel repeating network in an arbitrary transmission system including a digital television broadcasting system.

14 Claims, 12 Drawing Sheets

U.S. PATENT DOCUMENTS 6,501,955 B1 * 12/2002 Durrant et al. .............. 455/7 X
2003/0008669 A1 * 1/2003 Stein et al. ................. 455/456

FOREIGN PATENT DOCUMENTS

| KR | 1020020054576 | 12/2000 |
| KR | 1020030010387 | 7/2001 |
| KR | 1020030028629 | 9/2001 |
| KR | 1020040013665 | 2/2004 |
| KR | 1020050099797 A | 10/2005 |

OTHER PUBLICATIONS

Oh, Ji-Sung, et al., "A Design of VSB receiver IC for Digital Television", Aug. 1999, *IEEE Transactions on Consumer Electronics*, vol. 45, No. 3, pp. 943-949.

Wang, Xianbin, et al., "Transmitter Identification Using Embedded Spread Spectrum Sequences", Apr. 2003, *Proceedings of ICCT 2003*, vol. 2, pp. 1517-1523.

Ryu, Young-Jae, et al., "Frequency Synchronization Algorithm Robust to Pilot Distortion in ATSC System," Jun. 2002, *Consumer Electronics 2002 Digest of Technical Papers*, pp. 290-291.

* cited by examiner

APPARATUS AND METHOD OF ON-CHANNEL REPEATER

FIELD OF THE INVENTION

The present invention relates to an on-channel repeater that receives signals on one channel and distributes them on the same channel; and, more particularly, to an on-channel repeater that converts radio frequency (RF) signals transmitted from a main transmitter into baseband signals, equalizes the baseband signals by using a high-performance equalizer, adds a repeater identifier (ID) to the equalized baseband signals, converts the baseband signals with the repeater identifier again into RF signals, which become the same as the input signals, and a method thereof.

DESCRIPTION OF RELATED ART

Generally, main transmitters and repeaters are disposed according to surrounding geographical/natural features and service areas. Repeaters are set up in areas where the signals from a main transmitter are received weakly to thereby solve the problem in a poor signal reception area and expand the transmission signal coverage of the main transmitter.

FIG. 1 is an exemplary diagram showing a service using conventional repeaters, which repeat signals by using different frequencies.

In the service using conventional repeater as shown in FIG. 1, a signal is transmitted from a main transmitter 101 through a transmission frequency A, and then repeaters 102 to 105 repeat the signals through frequencies B, C, D and E different from the transmission frequency A. However, since the different frequencies B, C, D and E are given to the repeaters 102 to 105 of FIG. 1 to solve the problem of a weak signal reception area where the signals from the main transmitter 101 are received weakly or widen the service coverage, the repeaters 102 to 105 use a plurality of frequency bands, and this requires many frequency resources. Therefore, it is very inefficient in the respect of frequency usage.

FIG. 2 is another exemplary diagram illustrating a service using conventional on-channel repeaters, which use the same frequency to repeat signals. A main transmitter 201 sends out signals through a transmission frequency A, and on-channel repeaters 202 to 205 repeat the signals through the same frequency A, individually. In order to provide the service, receivers should be able to identify the signals transmitted from the main transmitter 201 and the on-channel repeater 202 to 205 through the same frequency A.

However, on-channel interference signals may occur and an equalizer of a receiver may not eliminate time delay signals generated based on multipath signals. Therefore, the service through the on-channel repeaters requires preconditions that the outputs signals of the on-channel repeaters should be the same as the output signals of the main transmitter, and that the time delay between the output signals from the on-channel repeaters and the main transmitter should be small.

Also, as shown in FIG. 2, when the service is provided by using the on-channel repeaters, there are areas where signals from the main transmitter and the on-channel repeaters are overlapped, and it is hard to discriminate between signals from the on-channel repeaters and signals from the main transmitter in the overlapped areas. That is, it becomes hard to analyze a service coverage of each repeater when a single frequency network is formed. Therefore, it needs to add a repeater identifier to the signals transmitted from the repeaters to discriminate between the signals from the on-channel repeaters and the signals from the main transmitter.

Hereafter, problems caused when signals are repeated by using conventional on-channel repeaters will be described with reference to FIGS. 3 to 6.

FIG. 3 is a diagram illustrating a conventional RF amplifying on-channel repeater. As shown in FIG. 3, the conventional RF amplifying on-channel repeater receives the RF signals transmitted from the main transmitter in a receiving antenna 301 and the RF receiver 302. The received RF signals pass through an RF band pass filter 303 and only signals of a desired signal band passes through the filter, and the passed RF signals are amplified in a high-power amplifier 304 and transmitted through an on-channel in a transmitting antenna 305. The RF amplifying on-channel repeater features short system delay and simple structure.

FIG. 4 is a block diagram illustrating a conventional IF converting on-channel repeater. As shown in FIG. 4, the conventional IF converting on-channel repeater receives RF signals transmitted from a main transmitter in a receiving antenna 401 and an RF receiver 402, and converts the RF signals into IF signals in an IF down-converter 403. The IF signals pass through an IF band pass filter 404 and only signals of a desired signal band pass the filter. The passed IF signals are converted into RF signals in an RF up-converter 405, and the RF signals are amplified in a high-power amplifier 406 and transmitted through a transmitting antenna 407. The IF converting on-channel repeater also features short system delay and simple structure. In addition, it has excellent selective characteristics in the band pass filter to the RF amplifying on-channel repeater of FIG. 3.

FIG. 5 is a block diagram describing a conventional SAW filter on-channel repeater. As illustrated in FIG. 5, the conventional SAW filter on-channel repeater receives RF signals transmitted from a main transmitter in a receiving antenna 501 and an RF receiver 502, and converts the RF signals into IF signals in an IF down-converter 503. The IF signals pass through a SAW filter 504 and only signals of a desired signal band pass the filter. The passed IF signals are converted into RF signals in an RF up-converter 505, and the RF signals are amplified in a high-power amplifier 506 and transmitted through a transmitting antenna 507. The SAW filter on-channel repeater also features short system delay and simple structure. In addition, it has excellent selective characteristics in the band pass filter to the IF converting on-channel repeater of FIG. 4.

FIG. 6 is a block diagram describing an on-channel repeater having demodulation and modulation processes. As shown in FIG. 6, the conventional on-channel repeater having demodulation and modulation processes receives RF signals transmitted from a main transmitter through a receiving antenna 601 and an RF receiver 602, and the received RF signals are converted into IF signals in an IF down-converter 603. The IF signals are converted into baseband signals in a demodulator 604, and the baseband signals are removed of noise and multipath signals generated in a transmission line between the main transmitter and the on-channel repeater in an equalizer and Forward Error Correction (FEC) decoder 605. The output signals of the equalizer and FEC decoder 605 go through error correction and encoding in an FEC encoder 606, and the FEC encoded signals are converted into IF band signals in a modulator 607. The IF signals are converted into RF signals in an RF up-converter 608, and the RF signals are amplified in a high-power amplifier 609 and transmitted in a transmitting antenna 610.

Since the conventional on-channel repeaters of FIGS. 3 to 5 do not convert the signals received from the main transmitters into baseband signals, it is hard to add a repeater identifier.

Also, since the conventional on-channel repeaters of FIGS. 3 to 6 cannot remove noise and multipath signals generated in the transmission line between the main transmitter and the on-channel repeater, feedback signals generated due to low isolation of the transmitting/receiving antennas of the on-channel repeaters, and system noise added to the on-channel repeater systems, the characteristics of output signals of the on-channel repeaters are inferior to those of input signals of the on-channel repeaters. Moreover, they have a problem that the transmission power is limited due to feedback signals generated by low isolation of the transmitting/receiving antennas of the on-channel repeaters.

Particularly, the on-channel repeaters of FIG. 6 convert the signals received from the main transmitter into baseband signals and improve the poor noise removing ability of the on-channel repeaters of FIGS. 3 to 5. However, since they include the FEC decoder/encoder, they increase the time delay, which is generally based on a microsecond unit, into a millisecond unit, and they recognize signals generated due to ambiguity of a general standard trellis encoder as noise and cannot remove the signals.

Therefore, it is desperately requested to develop an on-channel repeater that resolve the above problems, that is, the on-channel repeater that can output the same signals as those inputted from the main transmitter, produce short time delay between the signals from the main transmitter and the signals from the on-channel repeater, produce output signals having characteristics superior to the input signals of the on-channel repeater by removing multipath signals and noise generated by the transmission line between the main transmitter and the on-channel repeater, raise transmission power of the on-channel repeater by removing feedback signals generated due to low isolation of transmission/reception antennas of the on-channel repeater, and add a repeater identifier for discriminating the signals from the signals transmitted from the main transmitter.

SUMMARY OF THE INVENTION

It is, therefore, an object of the present invention to provide an on-channel repeater that receives signals on one channel and distributes the signals on the same channel by converting radio frequency (RF) signals transmitted from a main transmitter into baseband signals, equalizing the baseband signals in a high-performance equalizer, adding a repeater identifier (ID) to the equalized baseband signals, and converting the baseband signals with the repeater identifier into RF signals again.

The other objects and advantages can be understood by the following description and preferred embodiments. Also, the objects and advantages of the present invention can be realized by the means as claimed and combinations thereof.

In accordance with an aspect of the present invention, there is provided an on-channel repeater for receiving signals on one channel and distributing the signals on the same channel, which includes: a receiver for receiving RF signals transmitted from outside; a demodulator for demodulating the RF signals received in the receiver into baseband signals; an equalizer for equalizing the baseband signals obtained from the demodulator; an adder for adding a repeater identifier to the equalized baseband signals obtained in the equalizer; a modulator for modulating the baseband signals with the repeater identifier added in the adder into RF signals; and a transmitter for transmitting the RF signals modulated in the modulator.

In accordance with another aspect of the present invention, there is provided a on-channel repeating method for receiving signals on one channel and distributing the signals on the same channel, which includes the steps of: a) receiving RF signals transmitted from outside; b) demodulating the received RF signals into baseband signals; c) equalizing the demodulated baseband signals; d) adding. a repeater identifier to the equalized baseband signals; e) modulating the baseband signals with the repeater identifier into RF signals; and f) transmitting the modulated RF signals.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter. Also, if it is thought that specific description on prior art related to the present invention may blur the point of the present invention, the description will not be provided. Hereinafter, preferred embodiments of the present invention will be described in detail with reference to accompanying drawings.

Figure 1:
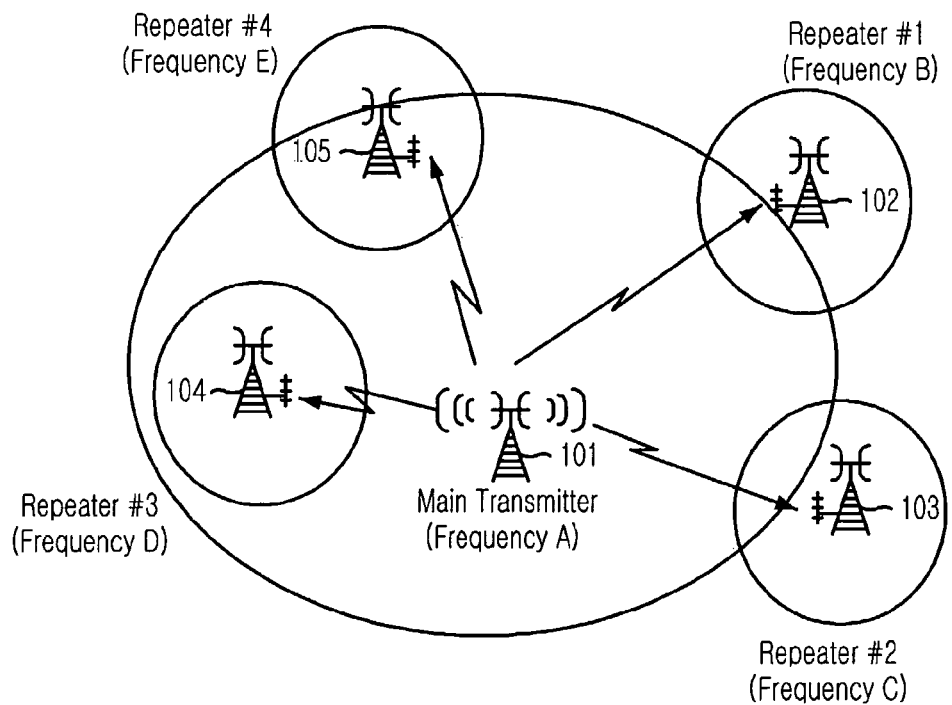
FIG. 1 is an exemplary diagram showing a service using conventional repeaters.
Figure 2:
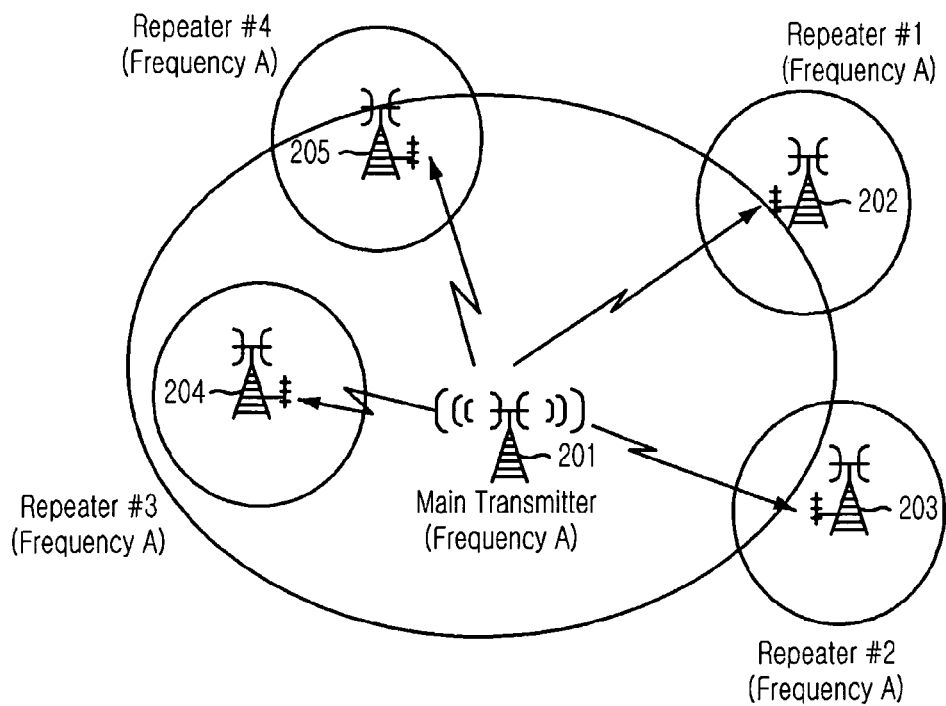
FIG. 2 is another exemplary diagram illustrating a service using conventional on-channel repeaters.
Figure 3:
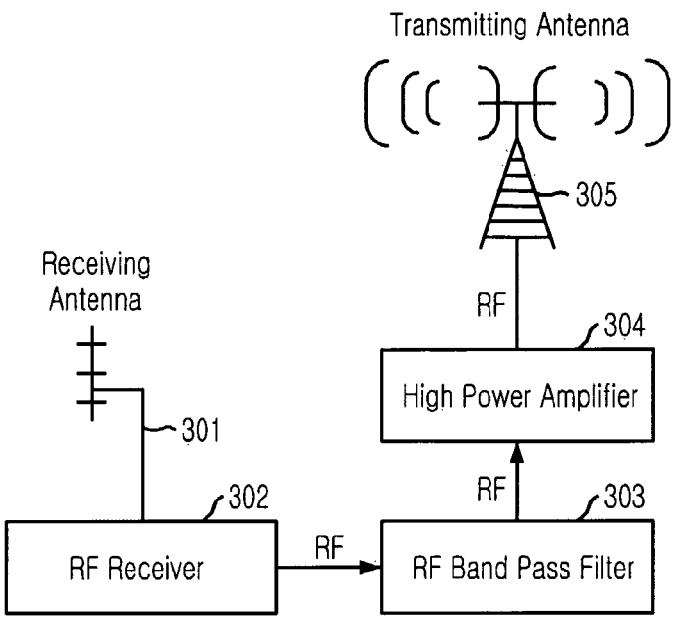
FIG. 3 is a diagram illustrating a conventional radio frequency (RF) amplifying on-channel repeater.
Figure 4:
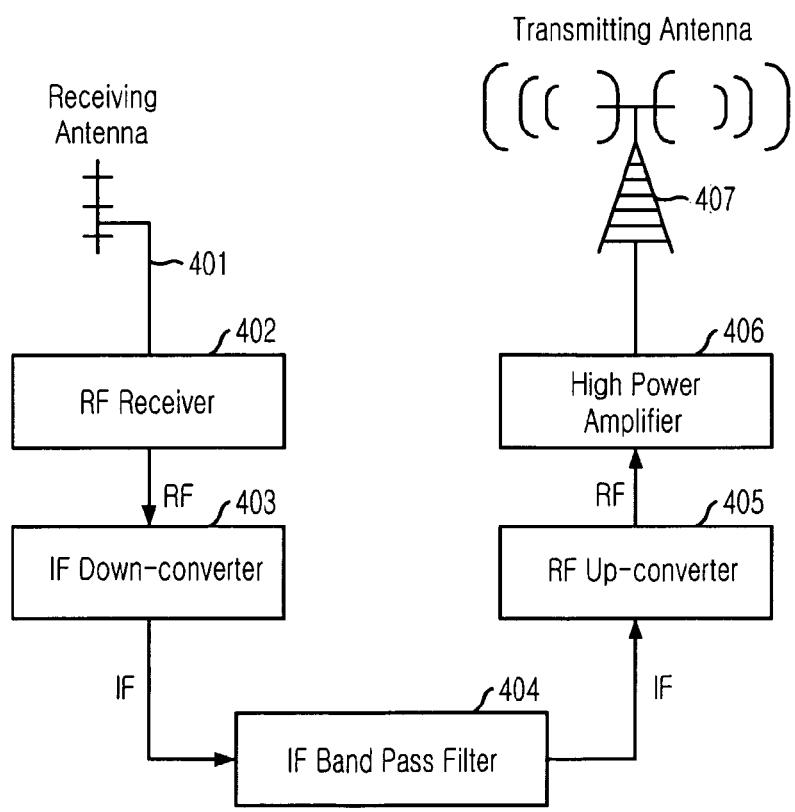
FIG. 4 is a block diagram illustrating a conventional IF converting on-channel repeater.
Figure 5:
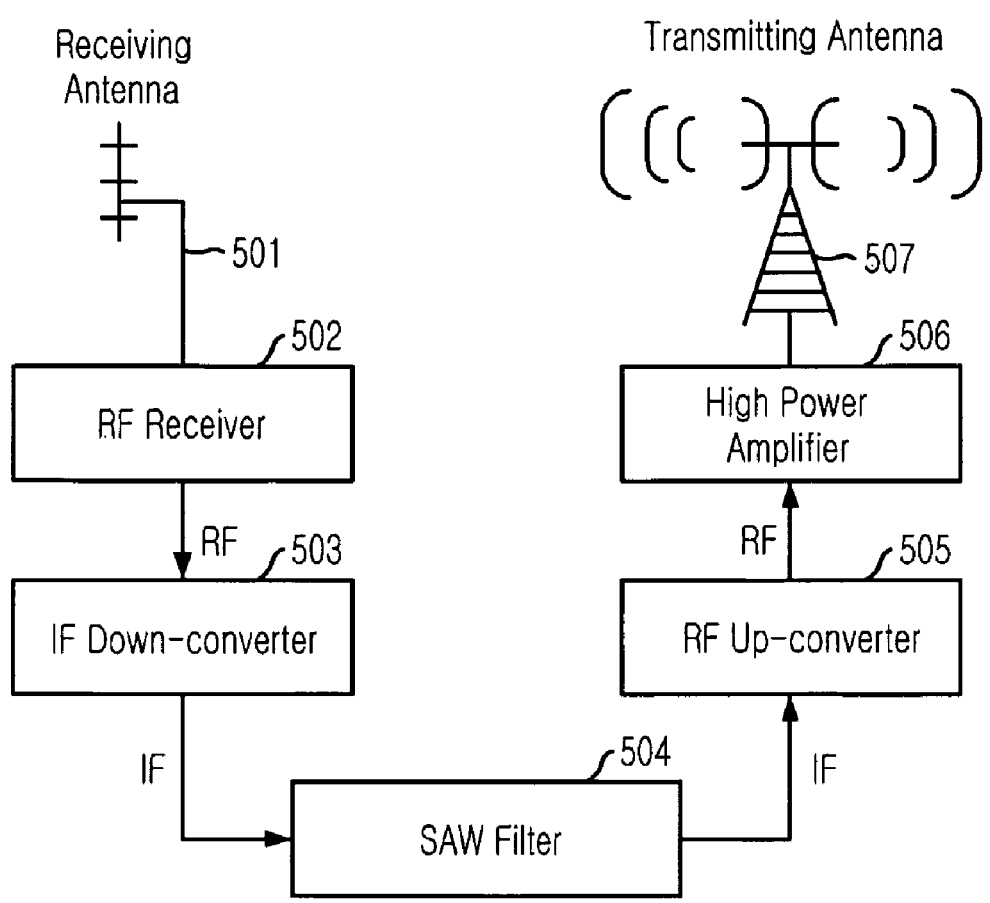
FIG. 5 is a block diagram describing a conventional SAW filter on-channel repeater.
Figure 6:
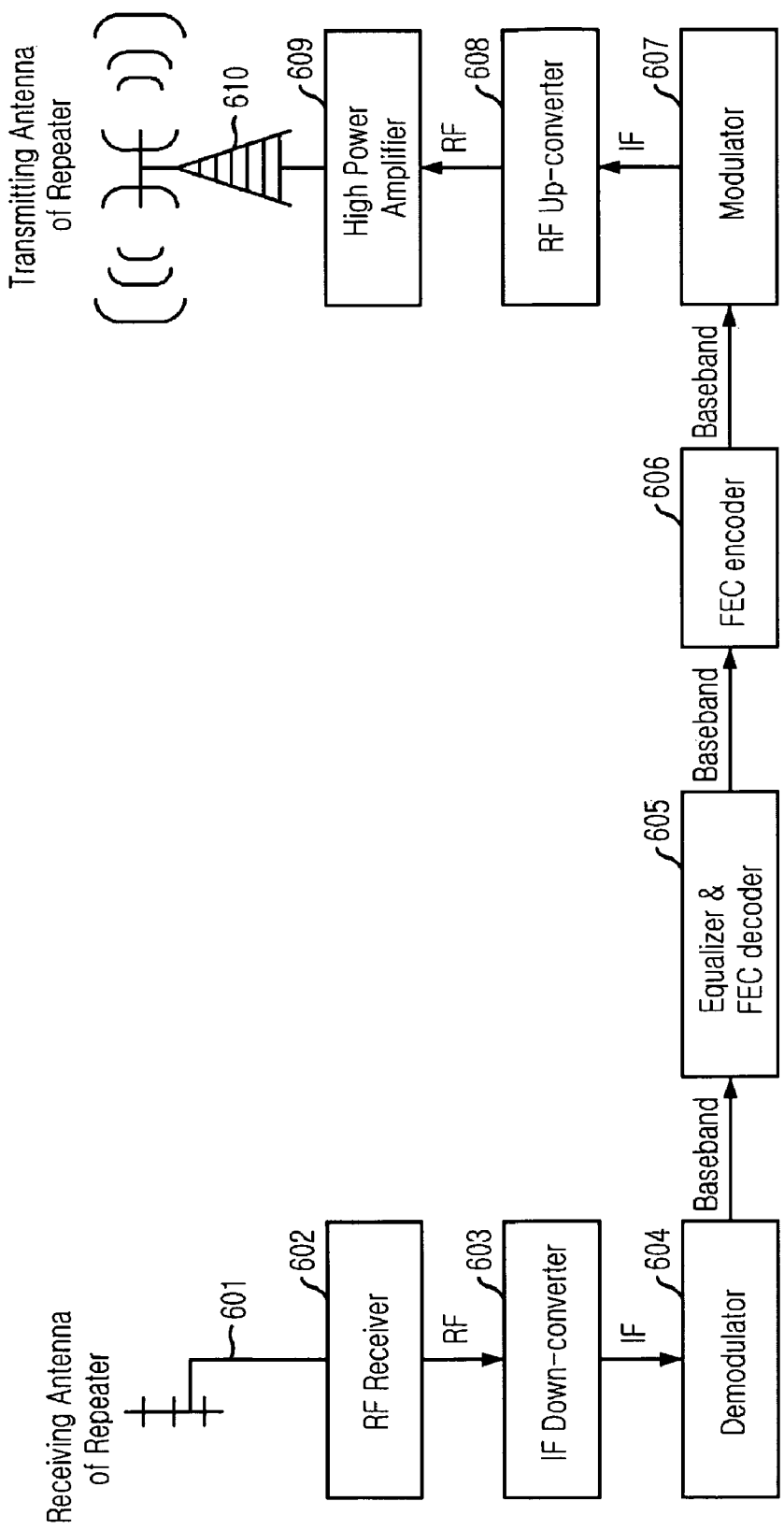
FIG. 6 is a block diagram describing an on-channel repeater having demodulation and modulation processes.
Figure 7:
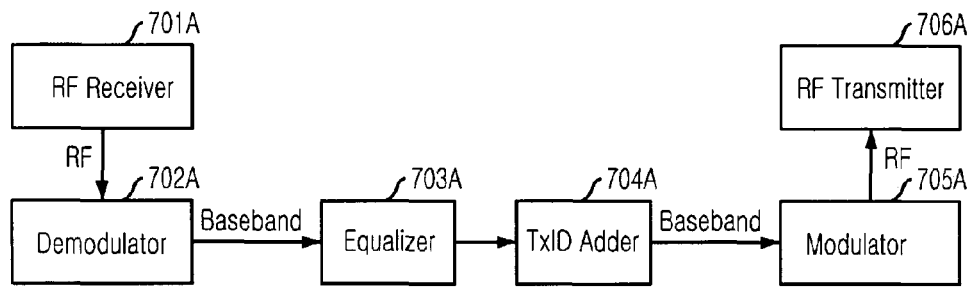
FIG. 7 is a block diagram illustrating an on-channel repeater in accordance with an embodiment of the present invention.

FIG. 7 is a block diagram illustrating an on-channel repeater in accordance with an embodiment of the present invention. As illustrated in FIG. 7, the on-channel repeater of the present invention includes a radio frequency (RF) receiver 701A, a demodulator 702A, an equalizer 703A, a transmission identifier (TxID) adder 704A, a modulator 705A, and an RF transmitter 706A.

The RF receiver 701A receives RF signals transmitted from a main transmitter and the demodulator 702A converts the RF signals into baseband signals.

The equalizer 703A removes noise and multipath channel signals generated in a transmission line between the main transmitter and the on-channel repeater from the baseband signals in the demodulator 702A, and removes feedback signals caused due to low isolation of a transmitting/receiving antenna of the on-channel repeater.

Also, the TxID adder 704A adds an identifier for identifying a repeater to the baseband signals deprived of the noise, multipath signals and feedback signals. Herein, the identifier can include not only a signal for identifying the repeater but also information needed by a service provider.

The modulator 705A modulates the baseband signals having the identifier for identifying the repeater into RF signals, and the RF transmitter 706A transmits the modulated RF signals.

Figure 12:
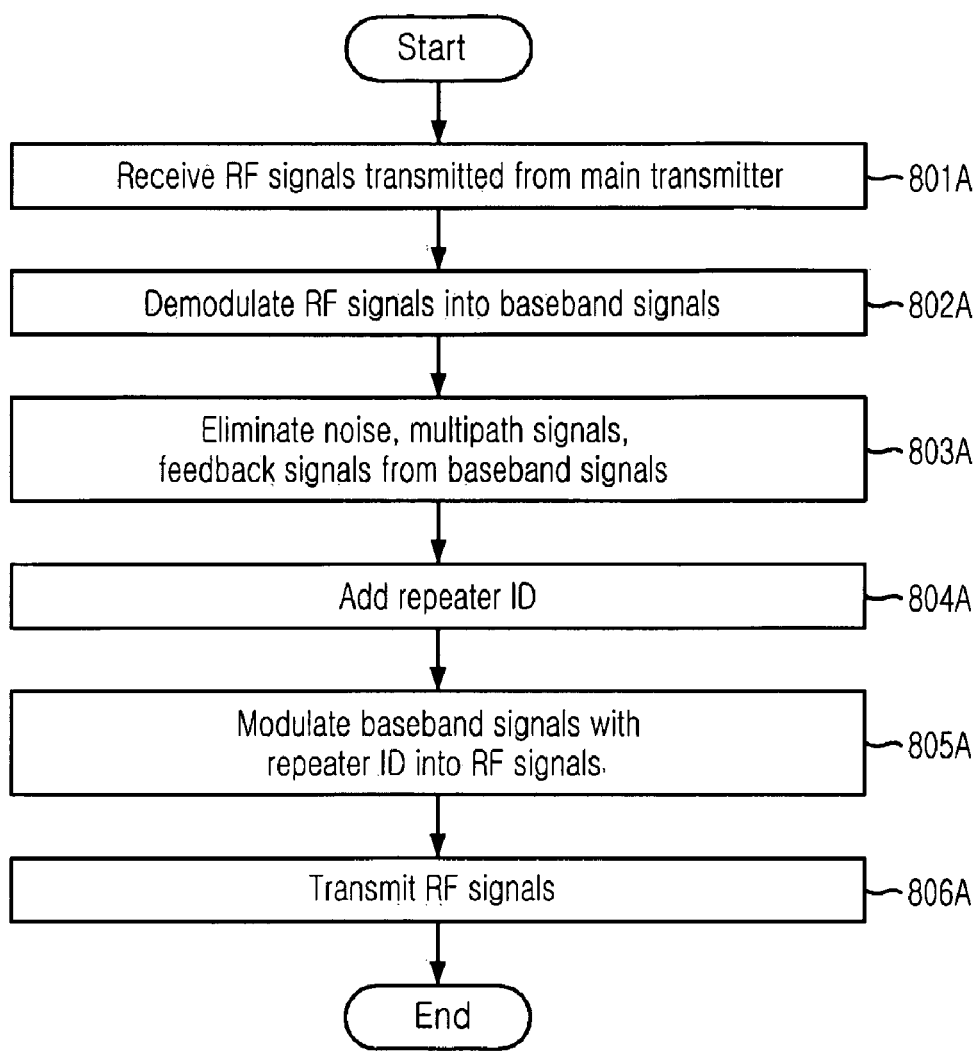
FIG. 12 is a flowchart illustrating a repeating method of the on-channel repeater of FIG. 7 in accordance with an embodiment of the present invention.

FIG. 12 is a flowchart illustrating a repeating method of the on-channel repeater of FIG. 7 in accordance with an embodiment of the present invention.

As shown in FIG. 12, at step 801A, RF signals transmitted from the main transmitter are received and, at step 802A, the RF signals are demodulated into baseband signals.

Subsequently, at step 803A, noise and multipath signals generated in a transmission line between the main transmitter and an on-channel repeater are removed along with feedback signals generated due to low isolation of transmitting/receiving antennas of the on-channel repeater.

Subsequently, at step 804A, an identifier is added to the baseband signals deprived of the noise, multipath signals and feedback signals to identify the on-channel repeater.

Then, at step 805A, the baseband signals with the identifier are converted into RF signals and, at step 806A, the RF signals are transmitted.

Figure 8:
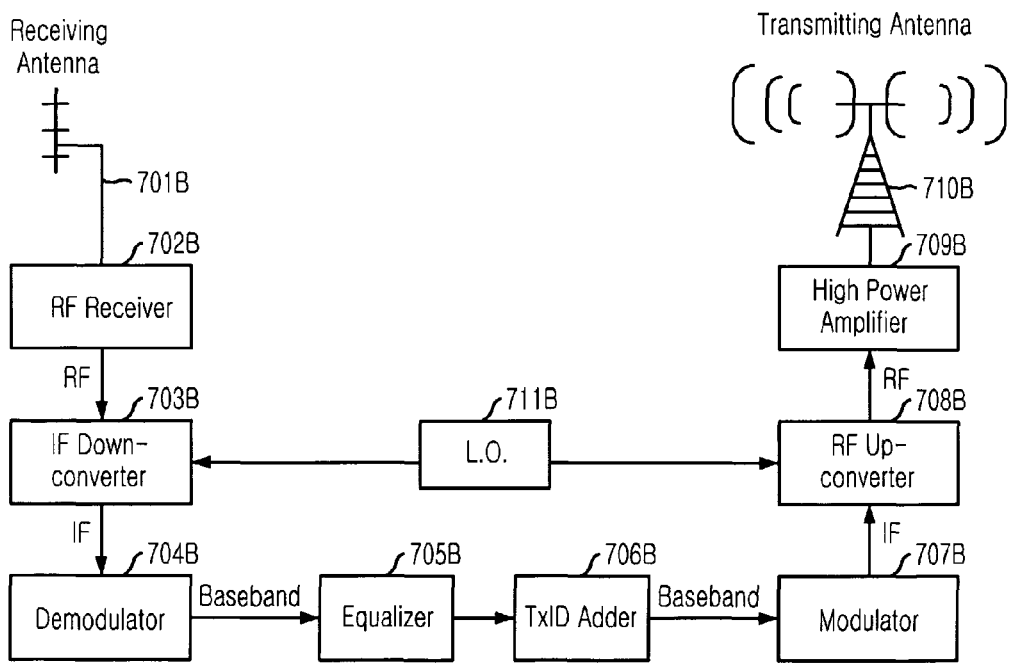
FIG. 8 is a block diagram depicting an on-channel repeater in accordance with another embodiment of the present invention.

FIG. 8 is a block diagram depicting an on-channel repeater in accordance with another embodiment of the present invention.

The on-channel repeater of FIG. 8 includes a receiving antenna 701B, an RF receiver 702B, an intermediate frequency (IF) down-converter 703B, demodulator 704B, an equalizer 705B, a TxID adder 706B, a modulator 707B, an RF up-converter 708B, a high-power amplifier 709B, a transmitting antenna 710B, and a local oscillator 711B.

The RF receiver 702B receives RF signals transmitted from a main transmitter through the receiving antenna 701B, and the IF down-converter 703B down-converts the RF signals into IF signals based on a first reference frequency provided from the local oscillator 711B.

The demodulator 704B demodulates the frequency down-converted IF signals into baseband signals, and the equalizer 705B corrects signal distortion caused in a transmission channel by equalizing the demodulated baseband signals and removes feedback signals generated due to low isolation of the transmitting/receiving antenna of the on-channel repeater.

The TxID adder 706B adds an identifier for identifying the repeater to the equalized baseband signal. Herein, the identifier may include not only a signal for identifying the repeater but also information needed by a service provider.

The modulator 707B modulates the baseband signals having the identifier for identifying the repeater into IF signals, and the RF up-converter 708B up-converts the modulated IF signals into RF signals based on a second reference frequency provided by the local oscillator 711B.

The high power amplifier 709B amplifies the frequency up-converted RF signals, and the transmitting antenna 710B transmits the amplified RF signals.

Figure 13:
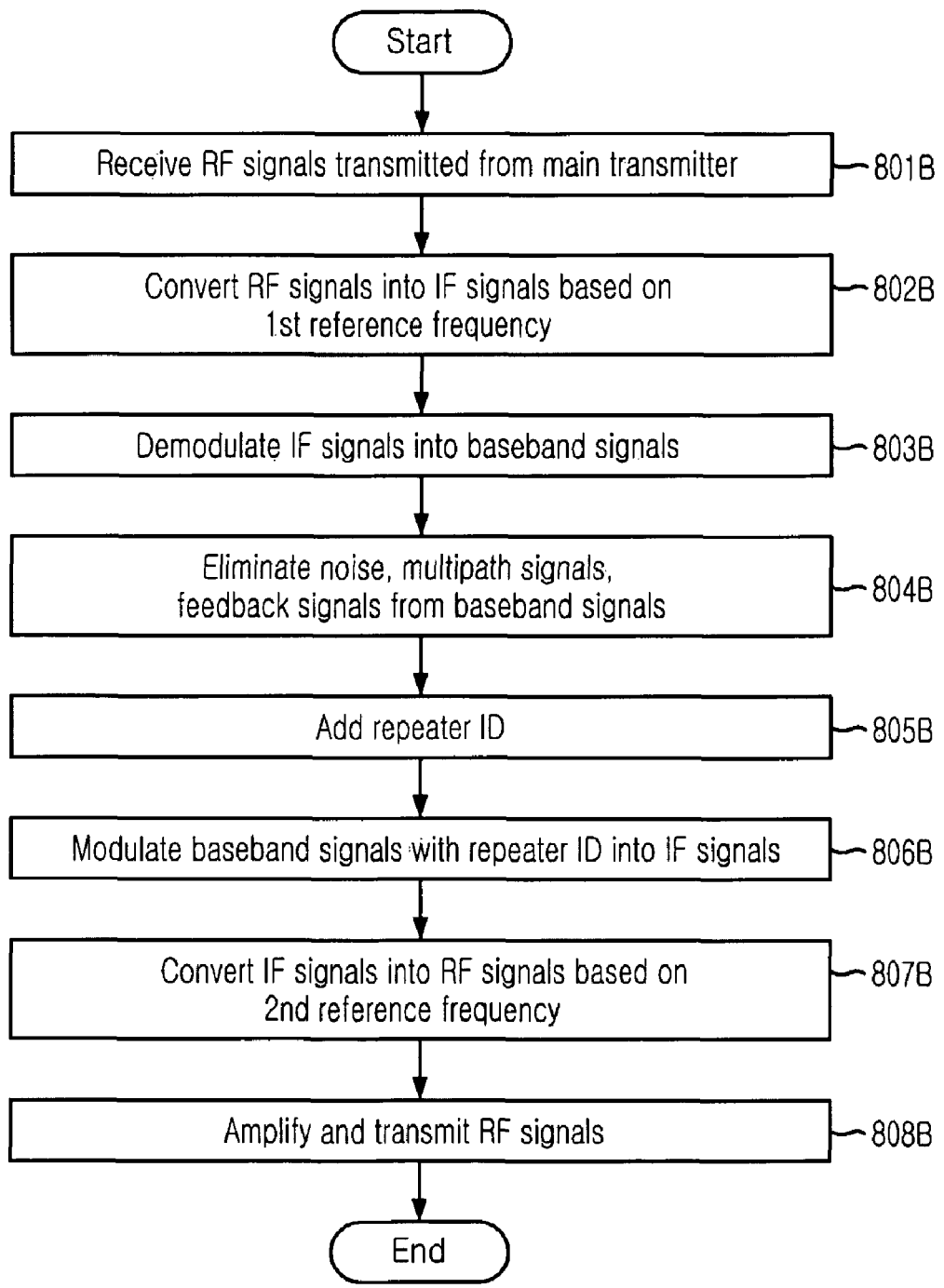
FIG. 13 is a flowchart showing a repeating method of the on-channel repeater of FIG. 8 in accordance with another embodiment of the present invention.

FIG. 13 is a flowchart showing a repeating method of the on-channel repeater of FIG. 8 in accordance with another embodiment of the present invention.

As shown in FIG. 13, at step 801B, RF signals transmitted from the main transmitter are received and, at step 802B, the RF signals are converted into IF signals based on a first reference frequency.

Subsequently, at step 803B, the IF signals are demodulated into baseband signals. Then, at step S804B, noise and multipath signals generated in a transmission line between the main transmitter and an on-channel repeater are removed from the demodulated baseband signals along with feedback signals generated due to low isolation of transmitting/receiving antennas of the on-channel repeater.

Subsequently, at step 805B, an identifier is added to the baseband signals deprived of the noise, multipath signals and feedback signals to identify the on-channel repeater.

Then, at step 806B, the baseband signals with the identifier are converted into IF signals and, at step 807B, the modulated IF signals are converted into RF signals based on a second reference frequency. At step 808B, the converted RF signals are amplified and transmitted.

Figure 9:
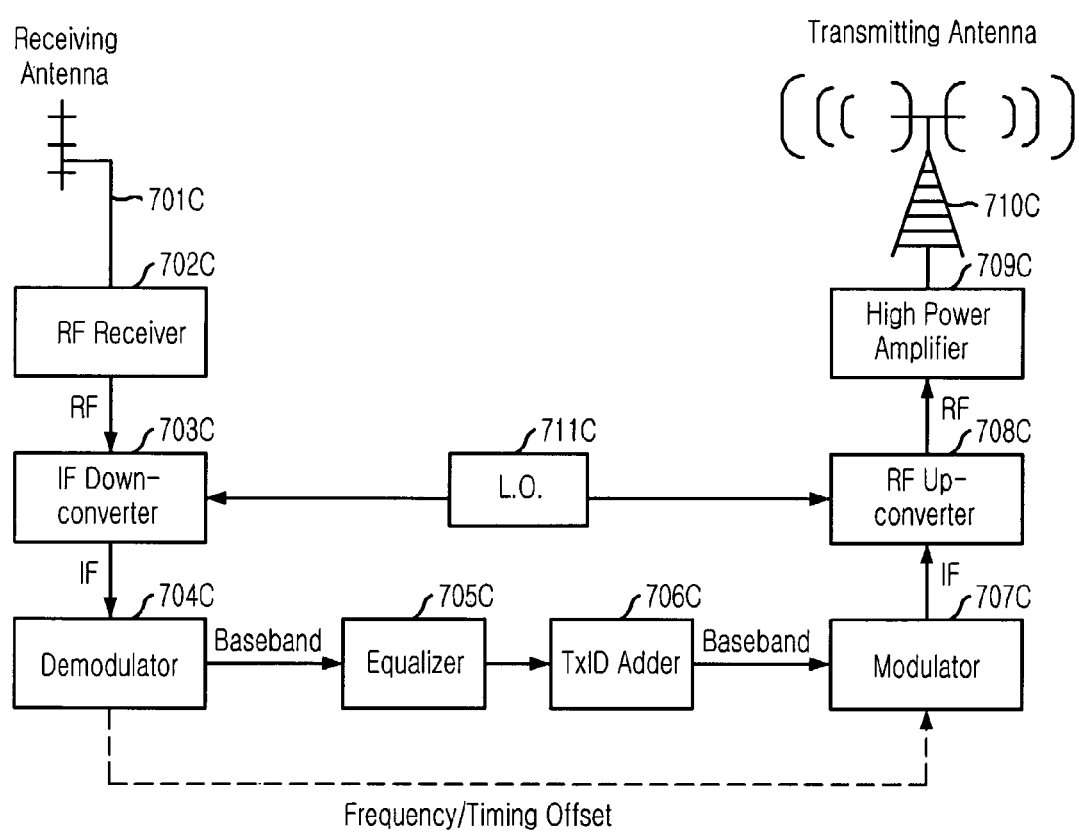
FIG. 9 is a block diagram describing an on-channel repeater in accordance with another embodiment of the present invention.

FIG. 9 is a block diagram describing an on-channel repeater in accordance with another embodiment of the present invention.

The on-channel repeater of FIG. 9 includes a receiving antenna 701C, an RF receiver 702C, an IF down-converter 703C, demodulator 704C, an equalizer 705C, a TxID adder 706C, a modulator 707C, an RF up-converter 708C, a high-power amplifier 709C, a transmitting antenna 710C, and a local oscillator 711C.

The RF receiver 702C receives RF signals transmitted from a main transmitter through the receiving antenna 701C, and the IF down-converter 703C down-converts the RF signals into IF signals based on a first reference frequency provided from the local oscillator 711C.

The demodulator 704C demodulates the frequency down-converted IF signals into baseband signals, generates a carrier frequency and a sampling timing offset by extracting a carrier frequency and sampling timing error information, and transmits them to the modulator 707C.

Also, the equalizer 705C corrects signal distortion caused in a transmission channel by equalizing the demodulated baseband signals and removes feedback signals generated due to low isolation of the transmitting/receiving antenna of the on-channel repeater.

The TxID adder 706C adds an identifier for identifying the repeater to the equalized baseband signals. Herein, the identifier may include not only a signal for identifying the repeater but also information needed by a service provider.

Meanwhile, the modulator 707C modulates the baseband signals having the identifier for identifying the repeater into IF signals by reflecting the carrier frequency and the sampling timing offset transmitted from the demodulator 704C, and the RF up-converter 708C up-converts the modulated IF signals into RF signals based on a second reference frequency provided by the local oscillator 711C.

The high power amplifier 709C amplifies the frequency up-converted RF signals and transmits them through transmitting antenna 710C.

Figure 14:
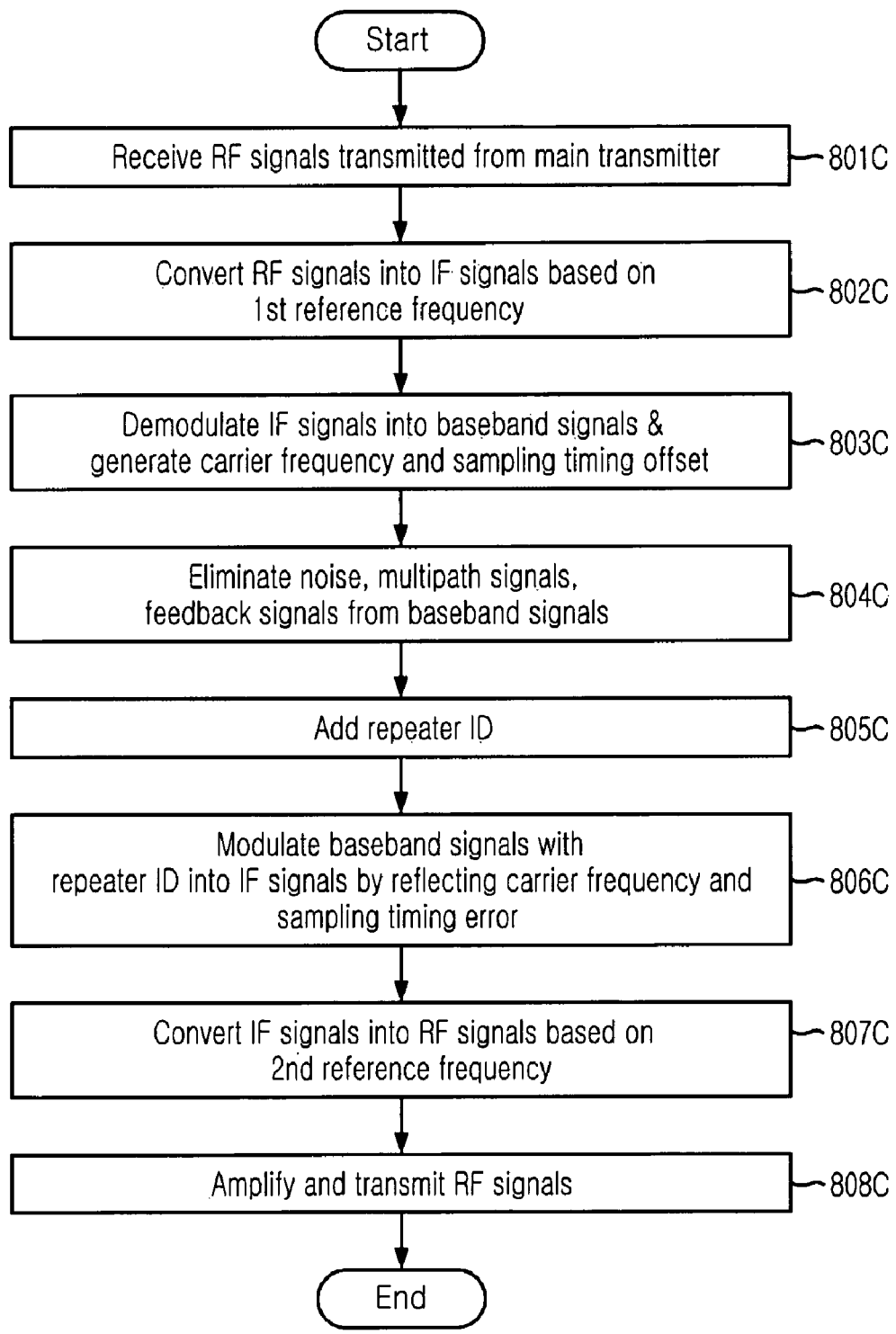
FIG. 14 is a flowchart depicting a repeating method of the on-channel repeater of FIG. 9 in accordance with another embodiment of the present invention.

FIG. 14 is a flowchart depicting a repeating method of the on-channel repeater of FIG. 9 in accordance with another embodiment of the present invention.

As shown in FIG. 14, at step 801C, RF signals transmitted from the main transmitter are received and, at step 802C, the RF signals are converted into IF signals based on a first reference frequency.

Subsequently, at step 803C, the IF signals are demodulated into baseband signals and a carrier frequency and a sampling timing offset are generated by extracting a carrier frequency and sampling timing error information. Then, at step 804C, noise and multipath signals generated in a transmission line between the main transmitter and an on-channel repeater are removed from the demodulated baseband signals along with feedback signals generated due to low isolation of transmitting/receiving antennas of the on-channel repeater.

Subsequently, at step 805C, an identifier is added to the baseband signals deprived of the noise, multipath signals and feedback signals to identify the on-channel repeater.

Then, at step 806C, the baseband signals with the identifier are converted into IF signals by reflecting the carrier frequency and the sampling timing error information and, at step 807C, the modulated IF signals are converted into RF signals based on a second reference frequency. At step 808C, the converted RF signals are amplified and transmitted.

Herein, the frequency of the signals transmitted from the transmitting antenna 710C of the on-channel repeater should be synchronized with the frequency of the signals transmitted from the main transmitter.

A method for synchronizing the frequencies is as follows.

First, RF signals received through the RF receiver 702C from the main transmitter are down-converted into IF signals in the IF down-converter 703C based on the first reference frequency provided by the local oscillator 711C, the IF signals obtained from the down-conversion are demodulated into baseband signals in the demodulator 704C.

Herein, the demodulator 704C including a carrier restoring device extracts a carrier frequency and sampling timing error information during a synchronization restoring process to thereby generate a frequency and a timing offset.

Subsequently, the modulator 707C modulates the baseband signals into IF signals based on the frequency and the timing offset. By doing so, IF signals reflecting the error of the RF signals transmitted from the main transmitter are generated.

Finally, the modulated IF signals reflecting the frequency and the timing offset are up-converted into RF signals in the RF up-converter 708C based on the second reference frequency provided by the local oscillator 711C and transmitted.

This way, the frequency of the signals outputted from the on-channel repeater is synchronized with the frequency of the signals transmitted from the main transmitter without using an additional reference signal.

Figure 10:
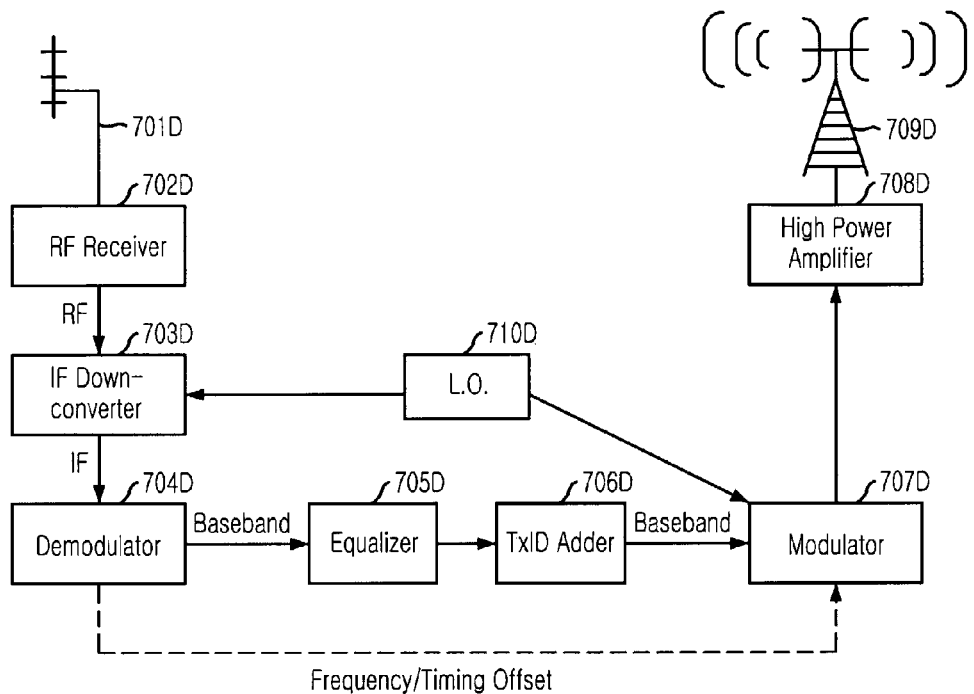
FIG. 10 is a block diagram illustrating an on-channel repeater in accordance with another embodiment of the present invention.

FIG. 10 is a block diagram illustrating an on-channel repeater in accordance with another embodiment of the present invention.

The on-channel repeater of FIG. 10 includes a receiving antenna 701D, an RF receiver 702D, an IF down-converter 703D, a demodulator 704D, an equalizer 705D, a TxID adder 706D, a modulator 707D, a high-power amplifier 708D, a transmitting antenna 709D, and a local oscillator 710D.

The RF receiver 702D receives RF signals transmitted from a main transmitter through the receiving antenna 701D, and the IF down-converter 703D down-converts the RF signals into IF signals based on a first reference frequency provided from the local oscillator 710D.

The demodulator 704D demodulates the frequency down-converted IF signals into baseband signals, generating a carrier frequency and a sampling timing offset by extracting a carrier frequency and sampling timing error information, and transmits them to the modulator 707D.

Also, the equalizer 705D corrects signal distortion caused in a transmission channel by equalizing the demodulated baseband signals and removes feedback signals generated due to low isolation of the transmitting/receiving antenna of the on-channel repeater.

The TxID adder 706D adds an identifier for identifying the repeater to the equalized baseband signals. Herein, the identifier may include not only a signal for identifying the repeater but also information needed by a service provider.

Meanwhile, the modulator 707D directly modulates the baseband signals having the identifier for identifying the repeater into RF signals based on a second reference frequency provided by the local oscillator 710D.

The high power amplifier 708D amplifies the frequency up-converted RF signals, and the transmitting antenna 709D transmits the amplified RF signals.

Figure 15:
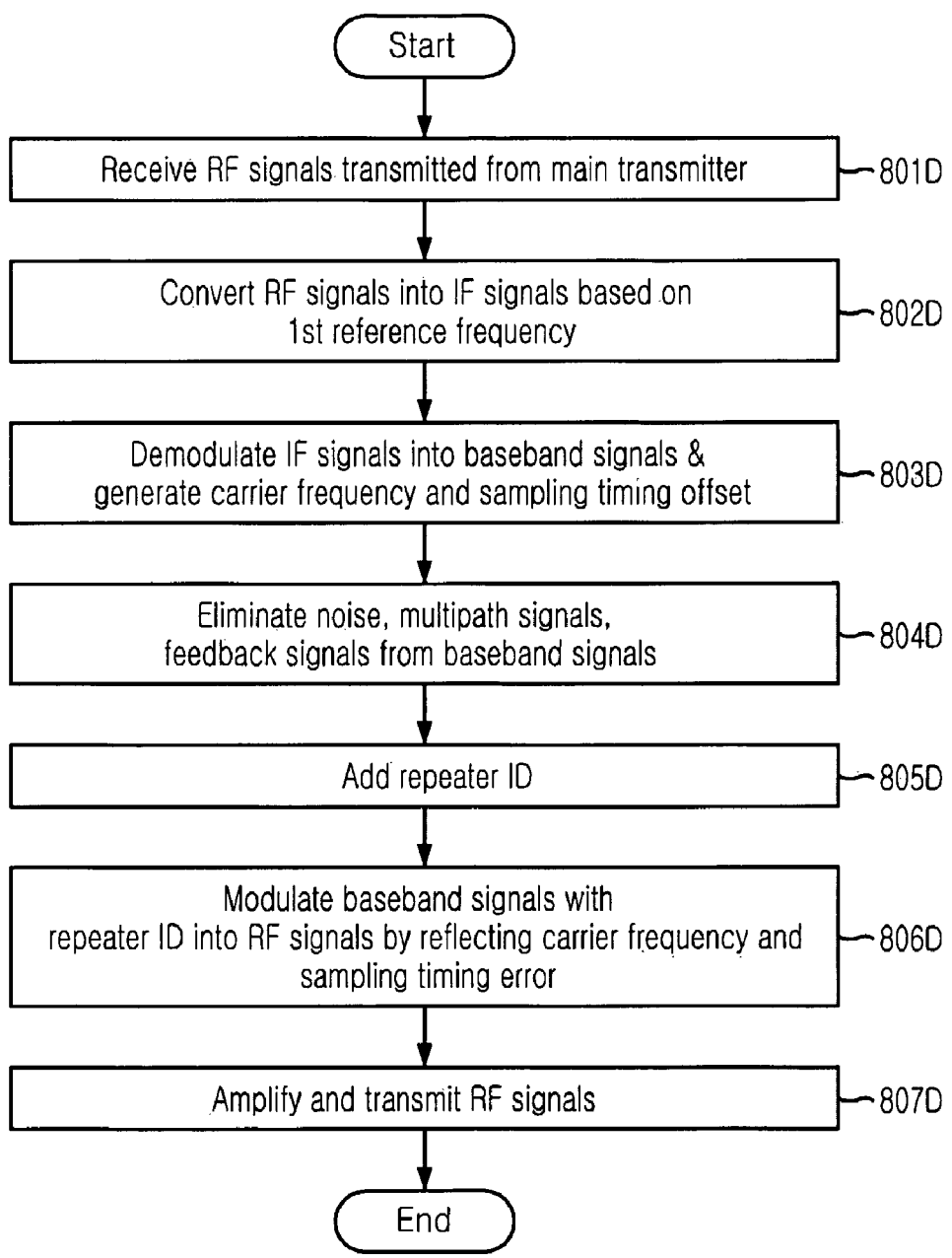
FIG. 15 is a flowchart illustrating a repeating method of the on-channel repeater of FIG. 10 in accordance with another embodiment of the present invention.

FIG. 15 is a flowchart illustrating a repeating method of the on-channel repeater of FIG. 10 in accordance with another embodiment of the present invention.

As shown in FIG. 15, at step 801D, RF signals transmitted from the main transmitter are received and, at step 802D, the RF signals are converted into IF signals based on a first reference frequency.

Subsequently, at step 803D, the IF signals are demodulated into baseband signals and a carrier frequency and a sampling timing offset are generated by extracting a carrier frequency and sampling timing error information. Then, at step S804D, noise and multipath signals generated in a transmission line between the main transmitter and an on-channel repeater are removed from the demodulated baseband signals along with feedback signals generated due to low isolation of transmitting/receiving antennas of the on-channel repeater.

Subsequently, at step 805D, an identifier is added to the baseband signals deprived of the noise, multipath signals and feedback signals to identify the on-channel repeater.

Then, at step 806D, the baseband signals with the identifier are modulated into RF signals based on the carrier frequency, the sampling timing error information, and a second reference frequency. At step 807D, the modulated RF signals are amplified and transmitted.

Herein, the frequency of the signals transmitted from the transmitting antenna 709D of the on-channel repeater is synchronized with the frequency of the signals transmitted from the main transmitter in a method similar to what is described in the embodiment of FIG. 9. The frequency synchronization method is as follows.

First, the RF signals transmitted from the main transmitter through the RF receiver 702D are down-converted into IF signals through the IF down-converter 703C based on the first reference frequency provided by the local oscillator 710D, and the down-converted IF signals are demodulated into baseband signals through the demodulator 704D.

Herein, the demodulator 704D including a carrier restoring device generates a frequency and a timing offset by extracting a carrier frequency and sampling timing error information.

Subsequently, the modulator 707D directly modulates the baseband signals into RF signals based on the frequency, the timing offset, and the second reference frequency. This way, RF signals reflecting the error of the RF signals transmitted from the main transmitter can be generated.

This method synchronizes the frequency of the signals outputted from the on-channel repeater with the frequency of the signals transmitted from the main transmitter without using an additional reference signals.

Figure 11:
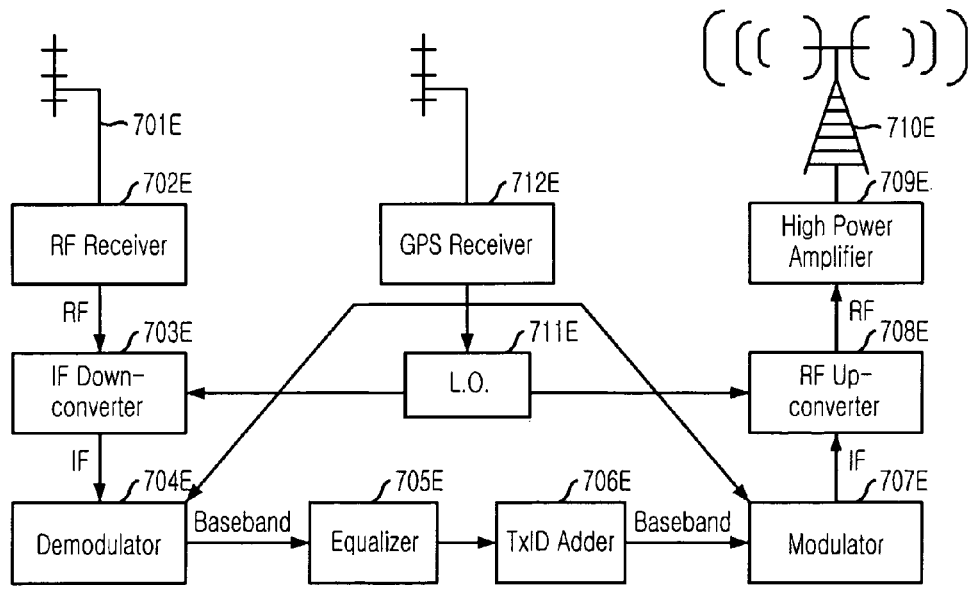
FIG. 11 is a block diagram depicting an on-channel repeater in accordance with another embodiment of the present invention.

FIG. 11 is a block diagram depicting an on-channel repeater in accordance with another embodiment of the present invention. The on-channel repeater further includes a Global Positioning System (GPS) receiver 712E in addition to the on-channel repeaters of FIGS. 8 and 9.

The GPS receiver 712E divides a received GPS reference signal and provides an oscillation signal needed for analog-to-digital conversion (ADC) in the demodulator 704E and digital-to-analog conversion (DAC) in the modulator 707E. Also, the GPS receiver 712E divides a received GPS reference signal and provides them to the local oscillator 711E. The local oscillator 711E transmits a reference frequency to the IF down-converter 703E and the RF up-converter 708E based on the GPS reference signal.

Meanwhile, the main transmitter receives the same GPS reference signal as the GPS reference signal that the on-channel repeater of FIG. 11 receives, and uses it to convert a digital signal into an analog signal and up-convert the converted analog signal into an RF signal.

Accordingly, the frequency of the signals transmitted from the transmitting antenna 710E of the on-channel repeater of FIG. 11 becomes the same as that of the signal transmitted from the main transmitter. However, there is a shortcoming that the GPS receiver should be set up additionally to the main transmitter and the on-channel repeater.

Since the on-channel repeater of the present invention removes noise and multipath signals generated in the transmission line between the main transmitter and the on-channel repeater by using the equalizer, the output signals of the on-channel repeater have superior characteristics to the input signals of the on-channel repeater. Also, since the feedback signals generated by the low isolation of the transmitting/receiving antenna of the on-channel repeater can be removed in the equalizer of the on-channel repeater, the transmission output power of the on-channel repeater can be increased. The suggested on-channel repeater has a relatively low system delay and it can build up a single frequency network efficiently by adding an identifier for identifying the repeater.

Therefore, when the on-channel repeater having the above structure is used, the output signals of the on-channel repeater become the same as the output signals of the main transmitter and the time delay between the signals of the on-channel repeater and the signals of the main transmitter is short. Also, the noise and multipath signals generated in the transmission line between the main transmitter and the on-channel repeater are removed. Thus, the output signals of the on-channel repeater have superior characteristics to the input signals of the on-channel repeater. In addition, the transmission output power of the on-channel repeater can be increased by removing the feedback signals generated due to low isolation of the transmitting/receiving antenna of the on-channel repeater.

Figure 16:
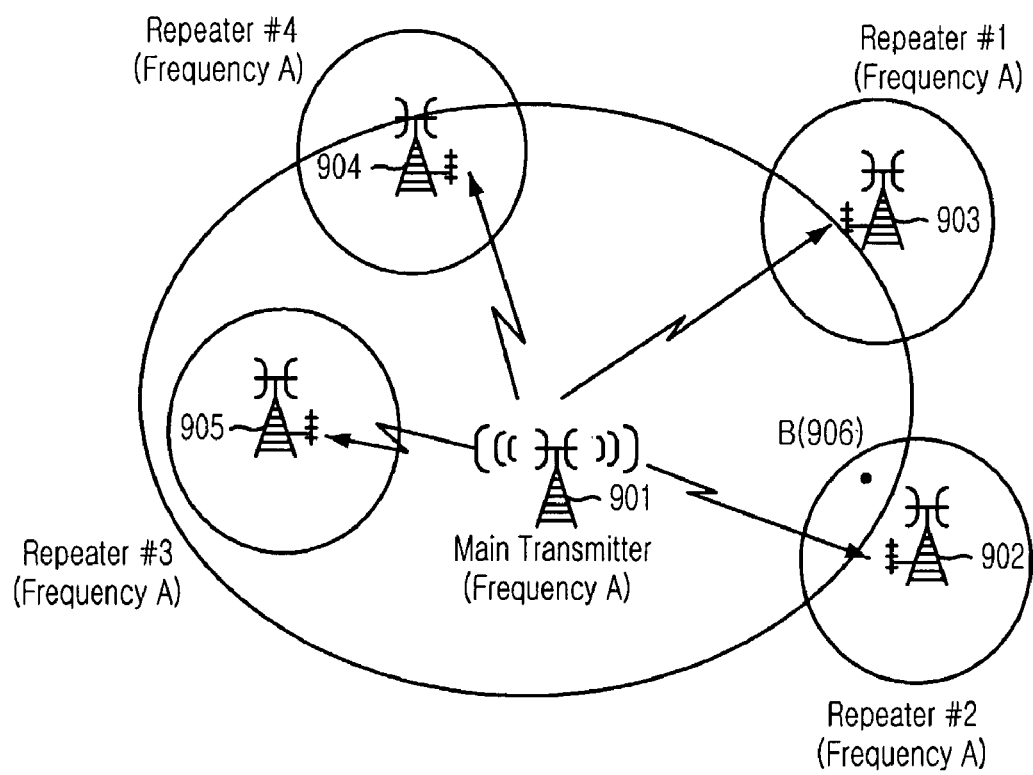
FIG. 16 is an exemplary diagram describing an on-channel frequency network using on-channel repeaters in accordance with an embodiment of the present invention.

FIG. 16 is an exemplary diagram describing an on-channel frequency network using on-channel repeaters in accordance with an embodiment of the present invention.

As illustrated in FIG. 16, when an on-channel frequency network is formed of a main transmitter 901 and a plurality of on-channel repeaters 902 to 905, there can be a place where the signals transmitted from the main transmitter 901 and the signals transmitted from the on-channel repeater 902, 903, 904 or 905 concurrently is received, such as a spot B 906.

If the main transmitter and the on-channel repeaters transmit signals by using different channels, it is possible to know whether a signal is transmitted from the main transmitter and the on-channel repeater easily and determine the output power of each on-channel repeater. However, if the main transmitter and the repeaters transmit signals by using the same channel, which is illustrated in FIG. 16, it cannot be known whether a signal is transmitted from the main transmitter or repeater and it is hard to determine the transmission power of the repeater.

According to the present invention, it is possible to recognize whether a signal is transmitted from the main transmitter or repeater and to determine the transmission power of each on-channel repeater by adding an identifier for identifying a repeater to a signal and transmitting the signal through the same channel. Thus, the on-channel frequency network shown in FIG. 16 can be built up efficiently.

Meanwhile, it should be made clear that the equalizer of the on-channel repeater suggested in the present invention can be operated whatever structure it has. That is, all known equalizers such as a viterbi decoder, a Soft Output Viterbi Algorithm (SOVA), a slicer and the like can be used. A network designer or a repeater designer can adopt an equalizer of the most appropriate type in consideration of the characteristics of transmission method and features of an on-channel repeater.

If any, it can be generally expected and proven by the present inventors that when an excellent equalizer is adopted, the entire performance of the on-channel repeater can be improved. Also, although the on-channel repeater and method of the present invention is suitable for digital television (DTV) broadcasting, e.g., the Advanced Television Systems Committee (ATSC) and Digital Video Broadcasting (DVB), they are not limited to them and they can be applied to any environment requiring a repeater to form a general single frequency network.

While the present invention has been described with respect to certain preferred embodiments, it will be apparent to those skilled in the art that various changes and modifications may be made without departing from the scope of the invention as defined in the following claims.

What is claimed is:

1. An on-channel repeater for receiving signals on one channel and distributing the signals, which are repeated on the same channel, the repeater comprising:
   a receiving unit for receiving radio frequency (RF) input signals;
   a demodulating unit for demodulating the RF signals received in the receiving unit into baseband signals; and for extracting a carrier frequency and sampling timing error information;
   an equalizing unit for equalizing the baseband signals obtained from the demodulating unit;
   an adding unit for adding a repeater identifier to the equalized baseband signals obtained in the equalizing unit;
   a modulating unit for modulating the baseband signals with the repeater identifier added in the adding unit into RF signals based on the carrier frequency and the sampling timing error information; and
   a transmitting unit for transmitting the RF signals modulated in the modulating unit on a same frequency as the Input signals.

2. The on-channel repeater as recited in claim 1, wherein the demodulation unit comprises:

a down-converter for down-converting the RF signals received in the receiving unit into intermediate frequency (IF) signals; and a demodulator for demodulating the IF signals obtained in the down-converter into baseband signals.

3. The on-channel repeater as recited in claim 2, wherein the demodulator demodulates the IF signals obtained in the down-converter into baseband signals and extracts the carrier frequency and sampling timing error information, and the modulating unit modulates the baseband signals into RF signals by reflecting the carrier frequency and the sampling timing error information.

4. The on-channel repeater as recited in claim 1, wherein the modulating unit comprises:

a modulator for modulating the baseband signals with the repeater identifier added in the adding unit into IF signals; and an up-converter for up-converting the IF signals modulated in the modulator into RF signals.

5. The on-channel repeater as recited in claim 1, wherein the demodulating unit comprises:

a down-converter for down-converting the RF signals received in the RF receiving unit into IF signals; and a demodulator for demodulating the IF signals obtained in the down-converter into baseband signals, and the modulating unit comprises:

a modulator for modulating the baseband signals with the repeater identifier added in the adding unit into IF signals; and an up-converter for up-converting the IF signals modulated in the modulator into RF signals.

6. The on-channel repeater as recited in claim 5, wherein the demodulator demodulates the IF signals obtained in the down-converter into baseband signals and extracts the carrier frequency and sampling timing error information, and the modulator modulates the baseband signals into IF signals by reflecting the carrier frequency and the sampling timing error information.

7. The on-channel repeater as recited in claim 1, wherein the demodulating unit demodulates the RF signals received in the RF receiving unit into baseband signals and extracts the carrier frequency and sampling timing error information, and the modulating unit modulates the baseband signals with the repeater identifier added in the adding means into RF signals by reflecting the carrier frequency and the sampling timing error information.

8. The on-channel repeater as recited in any one of claims 1 to 7, further comprising:

a local oscillator for providing a first reference frequency to up-convert signals and a second reference to the down-convert signals.

9. An on-channel repeating method for receiving signals on one channel and distributing the signals, which are repeated on the same channel, the method comprising the steps of:

a) receiving radio frequency (RF) input signals;

b) demodulating the received RF signals into baseband signals and extracting a carrier frequency and sampling timing error information;

c) equalizing the demodulated baseband signals;

d) adding a repeater identifier to the equalized baseband signals;

e) modulating the baseband signals with the repeater identifier into RF signals; and f) transmitting the modulated RF signals on a same frequency as the input signals.

10. The method as recited in claim 9, wherein the step b) includes the steps of:

b1) down-converting the received RF signals into IF signals; and b2) demodulating the IF signals obtained from the down-conversion into baseband signals.

11. The method as recited in claim 10, wherein, in the step b2), the IF signals obtained in the down-conversion are demodulated into baseband signals and the carrier frequency and sampling timing error information are extracted and, in the step e), the baseband signals with the repeater identifier are modulated into RF signals by reflecting the carrier frequency and the sampling timing error information.

12. The method as recited in claim 9, wherein the step b) includes the steps of:

b1) down-converting the received RF signals into IF signals; and b2) demodulating the IF signals obtained in the down-conversion into baseband signals, and the step e) includes the steps of:

e1) modulating baseband signals with the repeater identifier into IF signals; and e2) up-converting the modulated IF signals into RF signals.

13. The method as recited in claim 12, wherein, in the step b2), the IF signals obtained in the down-conversion are demodulated into baseband signals and the carrier frequency and sampling timing error information are extracted and, in the step e1), the baseband signals with the repeater identifier are modulated into IF signals by reflecting the carrier frequency and the sampling timing error information.

14. The method as recited in claim 9, wherein, in the step b), the received RF signals are demodulated into baseband signals and the carrier frequency and sampling timing error information are extracted and, in the step e), the baseband signals with the repeater identifier are modulated into RF signals by reflecting the carrier frequency and the sampling timing error information.

* * * * *